United States Patent [19]

Bahr

[11] Patent Number: 4,971,625

[45] Date of Patent: Nov. 20, 1990

[54] METHOD FOR LEACHING GOLD AND/OR SILVER OUT OF ORES OR OUT OF ORE-CONCENTRATES AND ALSO OUT OF PRECIOUS-METAL WASTES OR PRECIOUS-METAL SCRAP BY USING CYANIDE-CONTAINING LEACHING SOLUTIONS

[75] Inventor: Albert Bahr, Clausthal-Zellerfeld, Fed. Rep. of Germany

[73] Assignee: Degussa Aktiengesellschaft, Frankfurt am Main, Fed. Rep. of Germany

[21] Appl. No.: 292,239

[22] Filed: Dec. 30, 1988

[30] Foreign Application Priority Data

Jan. 22, 1988 [DE] Fed. Rep. of Germany ....... 3801741

[51] Int. Cl.$^5$ .............................................. C22B 11/04
[52] U.S. Cl. .................................... 75/118 R; 75/105; 423/29; 423/31
[58] Field of Search .......................... 75/2, 105, 118 R; 423/26, 27, 29, 30, 31

[56] References Cited

U.S. PATENT DOCUMENTS

| 732,605 | 6/1903 | Thede | 423/29 |
|---|---|---|---|
| 3,203,968 | 8/1965 | Sebba | 423/26 |
| 3,339,730 | 9/1967 | Boutin et al. | 423/26 |
| 3,826,723 | 7/1974 | Woods et al. | 204/110 |
| 4,421,724 | 12/1983 | Hunnel | 423/29 |
| 4,786,318 | 11/1988 | Owen et al. | 75/118 R |

FOREIGN PATENT DOCUMENTS 1221842 5/1987 Canada .

OTHER PUBLICATIONS

Davidson, R. J. et al. "The Intensive Cyandation of Gold-Plant Gravity Concentrates", J. of S. African Inst. of Min. and Met., Jan. 1978 pp. 146–165.

Day, E. L. "Some Factors Influencing the Rate of Dissolution of Gold in Sodium Cyanide Solutions", Presented at Annual Meeting of Canadian Gold Metallurgists, Ottawa, Jan. 17–19, 1967, pp. 55–60.

Primary Examiner—Robert L. Stoll
Attorney, Agent, or Firm—Beveridge, DeGrandi & Weilacher

[57] ABSTRACT

A method for leaching gold and/or silver out or other precious metal containing substance using cyanide-containing leaching solutions and adding an aqueous $H_2O_2$ solution to accelerate leaching. The total amount of the hydrogen-peroxide solution required for leaching is fed into the leaching slurry at the beginning of leaching. The amount of the $H_2O_2$ solution is determined in that the $H_2O_2$ is added in a 0.6 to 2.5-fold stoichiometric ratio to the cyanide concentration of the leaching slurry. The pH value of the leaching slurry is set and maintained at between 7 and 10 or between 11 and 13.

4 Claims, No Drawings

METHOD FOR LEACHING GOLD AND/OR SILVER OUT OF ORES OR OUT OF ORE-CONCENTRATES AND ALSO OUT OF PRECIOUS-METAL WASTES OR PRECIOUS-METAL SCRAP BY USING CYANIDE-CONTAINING LEACHING SOLUTIONS

INTRODUCTION AND BACKGROUND

The invention relates to a method for recovering precious metal components by leaching gold and/or silver out of ores or ore-concentrates and also out of precious-metal wastes or precious-metal scrap. Method for recovery of the precious metal values employs cyanide-containing leaching solutions having a pH value between 7 and 13 by adding an aqueous $H_2O_2$ solution.

In the heretofore conventional industrial procedure for leaching precious metals out of ores or ore-concentrates or other precious metal containing substances, the starting material is finely ground and dispersed in water to form a slurry. The pH value of the ore slurry is then raised into the alkaline pH range by adding lime or milk of lime, whereupon the complexforming cyanide is added, as a rule in the form of NaCN in an aqueous solution of approximately 5 to 20%. Next the ore slurry is agitated, with introduction of air, for 24 to 48 hours in stirring tanks or Pachuca tanks for a time period of 24 to 48 hours.

Because cyanides hydrolyze in the acid pH range while forming the highly toxic hydrocyanic acid, the pH value of the ore slurry must be raised into the alkaline range and be kept there. Ordinarily, the process takes place in the pH range from 10 to 11. Typically, this pH range is set by adding lime and milk of lime in the ratio of 80:20.

The cyanide concentration of the ore slurry depending on the ore composition ranges from 0.025 to 0.25 % by weight of NaCN. The cyanide is metered in the form of an aqueous solution of 2 to 20 % into the first of up to ten cascaded leaching tanks traversed by the slurry.

With regard to the introduction of air into the leaching slurry, a concentration of dissolved oxygen in the slurry is chosen to be as close as possible to the physically determined maximum value of about 8 to 9 ppm because at the practicable conventional cyanide concentration of 0.3 to 3 kg/ton of ore, the diffusion of the dissolved oxygen in the slurry determines the rate of leaching.

The leaching of gold and silver in cyanide solutions when using NaCN takes place according the formula below:

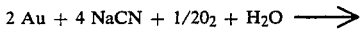

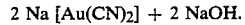

The above reaction takes place in two steps:

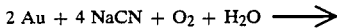

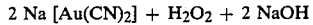

The peroxide formed in the first reaction step because of its decomposition into oxygen and water increases the concentration of the dissolved oxygen in the slurry. In lieu of the NaCN shown herein, KCN also may be used just as well.

It is known to use hydrogen peroxide when recovering precious metals by means of cyanide-containing leaching solutions. One process does not use the hydrogen peroxide to oxidize the precious metals, instead it uses it to detoxify the leaching slurries before they are drained away. The cyanide present in the slurries is decomposed therein by addition of hydrogen peroxide into non-toxic cyanate and ammonia. The decomposition of the cyanide takes place relatively rapidly only in the pH range of the known leaching procedure initially cited, wherein the oxygen is inserted into the leaching slurry in the form of blown air.

Another known procedure (US patent 3,826,723) provides for adding an aqueous $H_2O_2$ solution to preciousmetal leaches by means of cyanide-containing leaching solutions. This procedure, however, is not economical on account of its unusually high consumption of cyanide and would not be implemented on a commercial scale. In this known procedure, a shorter leaching time requires the cyanide concentration to be between 1 to 600 g of NaCN per liter of leach. In an illustrative example thereof 60 g of NaCN per liter of leach and 5 ml of stabilized 50 % by weight $H_{hd\,2}O_2$ are added per liter of leach. Moreover the known procedure requires adding 1 g of lignine sulfate per liter of leaching solution.

The molar ratio of $NaCN/H_2O_2$ set in the above known procedure indicates that operation takes place at a pH value between 9.5 and 11.5 as in the previously described detoxification of the leaching slurries. Because of the marked decomposition of the NaCN in its reaction with the added $H_2O_2$ only that NaCN added in excess is available for complexing the precious metals.

German patent 36 37 082, describes a procedure for the leaching of gold and/or silver out of ores or oreconcentrates employing an aqueous cyanide leaching solution with a pH of 8 to 13 and adding an aqueous solution of $H_2O_2$. However, this prior process is carried out by controlling the addition of said $H_2O_2$ solution by means of the concentration of the oxygen dissolved in the leaching solution, the oxygen content in said solution being set at 2 to 20 mg/liter. The purpose thereof is to carry out the leaching more 0 economically, in particular by reducing the $H_2O_2$ consumption, without thereby entailing higher sodium cyanide consumption relative to the previously known leaching with air blowing.

SUMMARY OF THE INVENTION

The object of the invention is to provide an improved leaching process and to appreciably shorten the leaching time relative to the known procedure while operating at the conventional NaCN concentration in the leaching slurry and with low consumption of $H_2O_2$, whereby also the costs of carrying out the method shall be significantly lowered.

In carrying out the present invention, the following features are noted:

(a) the required total amount of the hydrogenperoxide solution required for leaching is added to the leaching slurry at the beginning of leaching, (b) the hydrogen peroxide is added in a stoichiometric ratio of 0.6 to 2.5 to the cyanide concentration of the leaching slurry, and (c) the pH value of the leaching slurry is set and kept at between 7 and 10 or between 11 and 13.

The invention is based on the discovery that the reaction between NaCN and $H_2O_2$ is strongly inhibited, that is it takes place more slowly in the alkaline pH range below 10 or above 11 and up to 13. As a result, the NaCN is maintained as a complexing agent while simultaneously the desired concentration of dissolved oxygen in the slurry is obtained by the decomposition of the $H_2O_2$ as required for the reaction between the NaCN and the precious metal as explained initially above. By adding the total amount of the $H_2O_2$ solution required for leaching to the leaching slurry at the beginning of leaching, an optimal ratio of $H_2O_2$ concentration to the amount of precious metal to be leached and to the NaCN concentration is achieved over the entire leaching time. At the beginning of the leaching process, the greatest amounts of $H_2O_2$ will be offered when the leaching slurry contains the highest amounts of precious metals to be leached and the highest amounts of cyanide. As the precious metal is increasingly bound to the CN, the contents in $H_2O_2$ in the leaching slurry automatically adjust themselves to the lessened demand.

In order to accelerate the leaching process, it is necessary that as soon as the $H_2O_2$ solution is introduced, it be homogeneously dispersed in the leaching slurry because otherwise local detrimental molar ratios $NaCN/H_2O_2$ will occur in this leaching slurry which would result in accelerated decomposition of the NaCN whereby either the output of precious metals would be lowered or the necessary addition of NaCN would be increased. Accordingly, it is advantageous for the hydrogen-peroxide solution to be added continuously and homogeneously dispersed across the cross-section of a flow of leaching slurry. Because of the homogeneous dispersion of the $H_2O_2$ solution in a leaching slurry flow, a uniform reaction across the flow cross-section is moreover achieved from the time of addition, whereby again the leaching time is shortened. Especially advantageous ratios and leaching times are obtained when the pH of the leaching slurry is set between 8 and 9.5 or between 11.5 and 12.3.

The $H_2O_2$ solution can be added to the leaching slurry both before or after the cyanide is added. Advantageously, the addition of the $H_2O_2$ solution is added before the cyanide is introduced into the leaching slurry because thereby an $O_2$ enrichment and dispersion in the slurry can be achieved before the cyanide addition.

Just as in the conventional procedure, the NaCN concentration is about 0.25 to 1 g per liter of the leaching slurry. It was ascertained by a series of tests that when liter of leaching slurry at a pH of 9, almost 100% of the precious metals can be extracted from this slurry after about 100 minutes. The precious metals can be separated in problem-free manner by charcoal adsorption.

The new method reduces the time for leaching precious metals to 1/5 to 1/20 of the times needed by the conventional procedures of the state of the art. Instead of the previous leaching times of 24 to 48 hours times of 2 to 4 hours are sufficient when using the new method.

The amount of the added $H_2O_2$ solution is not limited by the quantity of NaCN present in the leaching slurry. Rather the $H_2O_2$ amount may be clearly higher than that required for complete decomposition of the NaCN, without having to incur an undesired decomposition of the NaCN. Practice has shown it is advantageous to add the $H_2O_2$ solution in such a quantity that the amount of the $H_2O_2$ is 0.1 to 2.5 kg per ton of ore, for typical cyanide concentrations of 0.1 to 3 kg of NaCN per ton of ore.

An advantageous mode of introduction of the $H_2O_2$ solution into the flow of leaching slurry is carried out by feeding the $H_2O_2$ solution crosswise to this flow of leaching slurry at 10 to 50 times the flow rate of the flow of leaching slurry. A preferred mode of implementation is characterized in that the leaching slurry is guided at a rate of 1 to 3 meters/sec. in the feed region of the $H_2O_2$ solution and, further, in that the cross-flow of the $H_2O_2$ solution is set for a rate of 10 to 100 meters/sec.

The feed of the $H_2O_2$ solution into the flow of leaching slurry is carried out by conventional feed devices, preferably by slit-nozzles dimensioned in the micron range. By means of the above steps, uniform dispersion of the $H_2O_2$ into the flow of the leaching slurry is achieved within fractions of a second. When using slit-nozzles, slit apertures of 5 to 100 microns are recommended if the $H_2O_2$ solution is added to the leaching slurry in the area of tubular cross-section having a diameter no larger than 10 cm.

If high proportions of cyanide-soluble iron or copper, in particular in the form of sulfides, are present in the precious-metal ores or ore-concentrates, then because of the catalytic effect of the Cu(II of Fe(III) ions or other equally acting metal ions, spontaneous decomposition of the $H_2O_2$ in the leaching slurry may take place and hence also rapid decomposition of the cyanide. These reactions occur throughout the entire pH range from 7 to 13, even in the above cited range between 7 to 10 or 11 to 13.

The above drawbacks can be avoided by adding flotation reagents or anionic polymers in amounts of 5 to 1,000 g per ton of ore, preferably 25 to 250 g per ton, to the leaching slurry, in order to passivate or sequester the copper or iron minerals. Preferably the addition of the flotation reagents or polymers takes place after the pH has been set in the leaching slurry, or before the $H_2O_2$ solution and the cyanide are added. Preferred sequestering or passivating agents are thiocarbonates, thiophosphates, thiocarbamates or anionic polymers in the form of acrylates, starches, and carboxymethyl cellulose. The passivating or sequestering agents as a rule are added in the form of a 0.1 to 10 % by weight aqueous solution to the leaching slurry. Any suitable agent of this type can be used for purposes of the invention.

The addition of the reagents as described herein advantageously should also take place in homogeneously dispersed manner over the cross-section of the slurry flow. When using aqueous solutions, this can be carried out using slit-nozzles, as already discussed in relation to the feed of the $H_2O_2$.solution The homogeneous or short-term dispersion of the passivating of sequestering agents results in shortening their reaction times with Cu or Fe minerals respectively.

DETAILED EMBODIMENTS OF INVENTION

Examples

The following results were obtained for a 2 liter glass beaker in the experiments carried out:

(A) Leaching conventionally with NaCN without adding $H_2O_2$.

A gold ore rich in malachite/azurite (this is the leaching residue of a shut down gold-processing plant) contains about 3 ppm gold and 1.2 % copper as an important accompanying element. The gold ore is ground to a $d_{80}$ value of 200 microns.

The ore is leached at a slurry density of 500 g of ore per liter of leach while being agitated with turbulence and with addition of NaCN between 0.02 to 0.2 % by weight. The pH values of the leaching slurries are varied between 9 and 12.

The gold yields in no case exceed 87 % in these tests. Maximum extraction in each case is achieved only after an approximate leaching time of 20 hours.

(B) Leaching the same ore as in (A) but with $H_2O_2$ addition.

0.6 ml of 35% $H_2O_2$ solution per liter of leach is fed through slit-nozzles, before the introduction of the NaCN, to the ore slurry having a density of 500 g of ore per liter of leach. This is carried out in such a way that a NaCN concentration of the leach of 0.05 % by weight is obtained. For the described addition of the $H_2O_2$ solution, the $H_2O_2$ concentration of the leach is 0.02 % by weight.

After a test of 3 hours and for the leaching slurry adjusted to 8 and 9 pH extractions of gold in excess of 97 % are achieved. When the pH values of the leaching slurry are 12, the extractions also are higher than 90%, namely 93 %. A gold yield less than 87 % is observed only in the range between the said pH values.

(C) Leaching a partially refractory pyrite-containing without adding $H_2O_2$ (gold content =1.3 ppm).

The ore ground to a $d_{80}$ value of 200 microns is reacted at a slurry density of 500 g of ore per liter of leach with 0.7 kg NaCN per ton of ore and is aerated by air being blown in. The slurry pH was set at 11.

After 24 hours a maximum gold extraction is achieved at about 62 %. After 3 hours, the gold extraction is 45%.

(D) Leaching the ore in (C) with addition of $H_2O_2$.

The slurry of (C) with the same amount of NaCN and after its pH value has been set to 9 receives the peroxide solution until the amount of $H_2O_2$ per ton of ore is 1.6 kg.

After leaching for 3 hours a gold extraction of 91 % is obtained.

(E) Leaching a gold-ore from Southeast Asia containing copper and iron sulfide (gold content=6 ppm).

Control tests were carried out when leaching the ore by adding an $H_2O_2$ solution with and without additives to passivate/sequester the copper/iron sulfide minerals; the results are shown in the Table below.

| Au extraction | pH 2.88 air | pH 9 $H_2O_2$ | pH 9 $H_2O_2$ AX | pH 9 $H_2O_2$ CMC | pH 9 $H_2O_2$ TTC |
|---|---|---|---|---|---|
| after 3 h. | 25% | 55% | 90% | 92% | >97% |
| after 24 h. | 68% | 58% | 91% | 93% | >97% |

In all tests the slurry density was 500 g of ore per liter of leach and the addition of NaCN was 0.8 kg per ton of ore. The $H_2O_2$ solution was added until 1 kg of $H_2O_2$ was present per ton of ore.

In the Table, the abbreviations are as follows: AX=amylxanthogenate, TTC=trithiocarbonate, CMC=carboxymethylcellulose. These aforementioned passivating/sequestering agents were added at the rate of 0.1 kg per ton of ore.

The Table shows that absent passivating sequestering the copper and iron sulfide, only a gold extraction of a maximum of 68 % is possible at a slurry pH of 11 and only of 55 % at a slurry pH of 9, and that further addition of $H_2O_2$ takes place, whereas an increase in extraction is achieved already after leaching for 3 h up to 97% when adding the said passivating sequestering reagents.

Further variations and modifications will be apparent from the foregoing to those skilled in the art and are intended to be encompassed by the appended claims.

We claim:

1. A method for leaching precious metals selected from gold, silver and mixture thereof out of a precious metal containing substance selected from ores, ore concentrates, precious metal wastes and precious metal scrap comprising contacting an aqueous leaching slurry of the said substance with a cyanide-containing leaching solution and an aqueous hydrogen-peroxide solution, wherein:

(a) the total amount of the hydrogen-peroxide solution required for leaching is added to said leaching slurry at the beginning of leaching, and before the cyanide is added, wherein said leaching slurry is in a flow and the hydrogen-peroxide solution is introduced as a cross-flow into the flow of the leaching slurry at a flow-rate which is 10 to 50 times higher than the flow-rate of the leaching slurry, and the peroxide solution is homogeneously dispersed in the cross-section of said flow, (b) the hydrogen peroxide is added in a 0.6 to 2.5-fold stoichiometric ratio to the cyanide concentration, wherein the $H_2O_2$ solution is added in such an amount that the proportion of the $H_2O_2$ is between 0.1 and 2.5 kg per ton of said substance for cyanide concentrations between 0.1 and 3.0 kg of NaCN per ton of said substance, and (c) the pH value of the leaching slurry is set and maintained at alkaline pH selected from pH value between 8 and 9.5 and pH value between 11.5 and 12.3.

2. The method defined in claim 1, wherein the leaching slurry is guided in the area where the $H_2O_2$ solution is fed-in at a flow-rate of 1 to 3 m/s and in that the cross-flow of the $H_2O_2$ solution is set to a flow-rate of 10 to 100 m/s.

3. The method defined in claim 1, wherein the $H_2O_2$ solution is fed through slit-nozzles dimensioned in the micron range into the flow of the leaching slurry.

4. A method for leaching precious metals selected from gold, silver and mixtures thereof out of a precious metal containing substance, wherein said substance is selected from ores and oreconcentrates in which cyanide-soluble non-precious metals selected from iron, copper and mixtures of same are present, comprising contacting an aqueous leaching slurry of the said substance with a cyanide-containing leaching solution and an aqueous hydrogen-peroxide solution, wherein:

(a) the total amount of the hydrogen-peroxide solution required for leaching is added to said leaching slurry at the beginning of leaching, and before the cyanide is added, wherein said leaching slurry is in a flow and the hydrogen-peroxide solution is introduced as a cross-flow into the flow of the leaching slurry at a flow-rate which is 10 to 50 times higher than the flow-rate of the leaching slurry, and the peroxide solution is homogeneously dispersed in the cross-section of said flow, (b) the hydrogen peroxide is added in a 0.6 to 2.5-fold stoichiometric ratio to the cyanide concentration, wherein the $H_2O_2$ solution is added in such an amount that the proportion of the $H_2O_2$ is between 0.1 and 2.5 kg per ton of said substance for cyanide concentrations between 0.1 and 3.0 kg of NaCN per ton of said substance, (c) the pH value of the leaching slurry is set and maintained at alkaline pH selected from pH value between 8 and 9.5 and pH value between 11.5 and 12.3, before contacting the slurry with the hydrogen peroxide solution and (d) further comprising the addition of passivating/sequestering agents selected from the group consisting of thiocarbonates, thiophosphates, thiocarbamates, acrylate anionic polymers, starch anionic polymers and carboxymethyl cellulose anionic polymers in a proportion of 25 to 250 g per ton of ore, to the leaching slurry, in order to passivate/sequester the said non-precious metals, wherein the addition of said agents is made after the pH-setting of the leaching slurry and before the $H_2O_2$ solution and the cyanide are added, and wherein the addition of passivating/sequestering agents is fed in the form of a 0.1 to 10% by weight aqueous solution to a flow of leaching slurry in cross-sectionally homogeneously dispersed manner.

* * * * *

UNITED STATES PATENT AND TRADEMARK OFFICE
CERTIFICATE OF CORRECTION

PATENT NO. : 4,971,625

DATED : November 20, 1990

INVENTOR(S) : ALBERT BAHR and THOMAS PRIESEMANN

It is certified that error appears in the above-identified patent and that said Letters Patent is hereby corrected as shown below:

On the title page:

In the heading at line 75, after "Albert Bahr, Clausthal-Zellerfeld, Fed. Rep. of Germany" insert:

--Thomas Priesemann, Clausthal-Zellerfeld, Fed. Rep. of Germany--.

Signed and Sealed this

Sixteenth Day of June, 1992

*Attest:*

DOUGLAS B. COMER

*Attesting Officer*    *Acting Commissioner of Patents and Trademarks*